United States Patent
Yip

(10) Patent No.: US 11,823,093 B2
(45) Date of Patent: *Nov. 21, 2023

(54) USER INTERFACE OVERLAY SYSTEM

(71) Applicant: Incisive Software Corporation, San Jose, CA (US)

(72) Inventor: Andrew Yip, Corvallis, OR (US)

(73) Assignee: Incisive Software Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,716

(22) Filed: Oct. 21, 2019

(65) Prior Publication Data
US 2020/0050974 A1 Feb. 13, 2020

Related U.S. Application Data

(63) Continuation of application No. 13/426,431, filed on Mar. 21, 2012, now Pat. No. 10,460,260, which is a continuation of application No. 12/062,486, filed on Apr. 3, 2008, now abandoned.

(51) Int. Cl.
*G06Q 10/00* (2023.01)
*G06F 9/451* (2018.01)

(52) U.S. Cl.
CPC ............. *G06Q 10/00* (2013.01); *G06F 9/451* (2018.02)

(58) Field of Classification Search
CPC ...... G06F 9/453; G06F 3/04845; G06F 9/451; G06F 3/0486; G06Q 10/00
See application file for complete search history.

(56) References Cited

U.S. PATENT DOCUMENTS

| | | | | |
|---|---|---|---|---|
| 5,577,188 A | * | 11/1996 | Zhu ........................ | G06F 3/0481 715/202 |
| 5,760,772 A | * | 6/1998 | Austin .................. | G06F 3/0481 715/798 |
| 6,256,649 B1 | * | 7/2001 | Mackinlay .............. | G06F 40/18 715/212 |
| 7,429,993 B2 | * | 9/2008 | Hui ........................ | G06F 3/0481 345/592 |
| 9,448,722 B2 | * | 9/2016 | Yuan ................... | G06F 3/04883 |

(Continued)

*Primary Examiner* — Michael Roswell
(74) *Attorney, Agent, or Firm* — Larry E. Henneman, Jr.; Henneman & Associates, PLC

(57) ABSTRACT

A method and system for providing an overlay window for an application to display augmentation data over the user interface of the application is provided. An overlay system includes an overlay component and an engine component that interface with the application and a presentation manager used by the application to provide the application window. When the overlay system starts up, it initializes the overlay component and the engine component. The overlay component tracks the portion of the application that is currently visible and displays augmentation data in an overlay window over the application window. The engine component provides augmentation functionality that generates the augmentation data and generates the overlay window based on the augmentation data. When the visible portion of the application data changes, the overlay component requests the engine component to generate the overlay window for the currently visible application data.

18 Claims, 9 Drawing Sheets

(56) References Cited

U.S. PATENT DOCUMENTS

| | | | | |
|---|---|---|---|---|
| 2003/0001899 A1* | 1/2003 | Partanen | ............. | G06F 3/04883 |
| | | | | 715/800 |
| 2003/0071850 A1* | 4/2003 | Geidl | .................. | G06F 3/04883 |
| | | | | 715/781 |
| 2005/0273700 A1* | 12/2005 | Champion | .......... | G06F 3/04883 |
| | | | | 715/233 |
| 2007/0208438 A1* | 9/2007 | El-Mankabady | ...... | G05B 15/02 |
| | | | | 700/83 |
| 2007/0239291 A1* | 10/2007 | Wayland | ............ | G05B 23/0272 |
| | | | | 700/83 |
| 2009/0004410 A1* | 1/2009 | Thomson | ............... | G06Q 10/00 |
| | | | | 428/29 |
| 2009/0106674 A1* | 4/2009 | Bray | ..................... | G06F 16/156 |
| | | | | 715/762 |
| 2010/0023865 A1* | 1/2010 | Fulker | ................... | H04L 67/025 |
| | | | | 715/734 |
| 2020/0302910 A1* | 9/2020 | Dukhovny | ............ | G10L 13/047 |

* cited by examiner engine data structure 300 cell table 124

| cell id | status | IDisplayObject |
|---|---|---|
| A1 | audited | |
| A2 | not audited | | region table 125

| region id | cell range | status | IDisplayObject |
|---|---|---|---|
| R1 | A1 ... D5 | suspect | |

*FIG. 3* overlay data structure 200 visible cell table 113

| cell id | location |
|---|---|
| A1 | (101, 101) (120, 200) |
| A2 | (121, 100) (140, 200) |

*FIG. 2*

USER INTERFACE OVERLAY SYSTEM

RELATED APPLICATIONS

This application is a continuation of U.S. application Ser. No. 13/426,431, filed on Mar. 21, 2012 by the same inventor (now U.S. Pat. No. 10,460,260), which is a continuation of U.S. application Ser. No. 12/062,486, filed on Apr. 3, 2008 by the same inventor (now abandoned), both of which are incorporated herein by reference in their respective entireties.

BACKGROUND

A spreadsheet program is a computer application that displays multiple cells that together make up a grid consisting of rows and columns, called a spreadsheet. Each cell contains an alphanumeric value, a numeric value, or a formula. When cells are displayed, the alphanumeric value or numeric value of each cell is displayed. If, however, a cell contains a formula, then the value of that formula is calculated to generate an alphanumeric or numeric value that is then displayed for the cell. A formula may be defined in terms of mathematical operations (e.g., addition or multiplication), mathematical functions (e.g., net present value), and nonmathematical functions (e.g., a table lookup) that can be performed on various operands. The operands may include constant alphanumeric or numeric values or may include references to other cells. When a formula references another cell, then the value of the other cell is used as the operand. The other cell may itself contain an alphanumeric value, a numeric value, or a formula. If the other cell contains a formula, then that formula may have operands that reference yet other cells. Thus, the value of one cell may depend on the values of many other cells either directly (i.e., as operands of the formula that explicitly reference another cell) or indirectly (e.g., as operands of the formula of an explicitly referenced cell that itself contains a formula that references another cell). Whenever a value of a cell changes, the spreadsheet recalculates the value of any cell whose value depends directly or indirectly on the value of that cell.

Spreadsheet programs have become very popular, especially for financial analysis. A spreadsheet that supports sophisticated financial analyses can be very large and quite complex. It is not uncommon for spreadsheets to contain thousands of cells with very complex formulas and data dependencies. Because of the complexity and size of these spreadsheets, it can be difficult for the developer of a spreadsheet to ensure that the spreadsheet performs the desired calculations. Even simple typographical errors in a formula (e.g., AB256 rather than AB255) can result in subtle errors that are difficult to detect.

A developer of a spreadsheet may provide the spreadsheet to others, such as customers, so that they can use the spreadsheet to calculate values based on their own initial data. To do so, the developer would provide a file containing the spreadsheet that can be loaded using the spreadsheet program and initialized with data of the customer as appropriate. The spreadsheet program then calculates the values of the spreadsheet based on the data.

Tools can be provided to help a person (e.g., a developer or customer of a developer) ensure the correctness of a spreadsheet. As part of ensuring the correctness, the tools may point out potential problems to the user or may point out portions of the spreadsheet whose correctness has been verified. These tools could provide a static report of their results. For example, a tool may provide a user interface that lists cells by their identifier (e.g., "A1") with suspect formulas. Some tools could even modify the spreadsheet to help highlight these problems. For example, a tool might change the background color of a suspect cell to red. Unfortunately, once a tool starts to modify a spreadsheet, it can be extremely difficult to determine whether the cause of a problem is the spreadsheet as provided by the developer or modification to the spreadsheet.

SUMMARY

A method and system for providing an overlay window for an application to display augmentation data over the user interface of the application is provided. In some embodiments, an overlay system includes an overlay component and an engine component that interface with the application and a presentation manager used by the application to provide the application window. For example, the application may be a spreadsheet program such as MICROSOFT EXCEL, and the presentation manager may be the user interface functionality provided by an operating system such as MICROSOFT WINDOWS. In the following, the overlay system will be described as used in conjunction with a spreadsheet program. One skilled in the art will, however, appreciate that the overlay system can be adapted to be used with many different types of applications, such as drawing programs, word processing programs, tax preparation programs, database programs, and so on. The overlay system may be implemented as an add-in to the spreadsheet program. When the add-in is launched, the overlay system starts up the overlay component and the engine component. The overlay component tracks the portion of the spreadsheet that is currently visible in the spreadsheet window and displays overlay elements in an overlay window over the spreadsheet window. The engine component provides augmentation functionality that generates the augmentation data and generates the overlay window by adding overlay elements that are derived from the augmentation data. For example, the augmentation functionality may be to track an auditor's review of a spreadsheet by marking cells or regions of cells as not audited, correct, suspect, and so on. When the cells that are currently visible change, the overlay component requests the engine component to generate the overlay window for the currently visible cells. For example, the engine component may add overlay elements to the overlay window so that correct cells have a green background, suspect cells have a red background, and so on. The engine component may also add overlay elements to the overlay window for various controls (e.g., buttons, drop-down list, combo-boxes, or free form boxes) through which engine component can interact with a user to support the augmentation functionality. The overlay component then displays the overlay window over the spreadsheet window to effect the display of the overlay elements over the spreadsheet. To the user, it looks as if the spreadsheet was actually modified to include the overlay elements in part because the overlay window may have no visible manifestation (e.g., no borders) except for the overlay elements. When the user interacts with the overlay window (e.g., via the controls), the overlay component 'notifies the engine component so that it can implement its user interface functionality. For example, an auditor may place an "x" or a "✓" on a cell to indicate whether the cell has been verified as being incorrect or correct. In addition, the overlay system allows the augmentation data to be stored separately from the spreadsheet data either persistently or non-persistently. Thus, the overlay system provides visual feedback to a user as to the status of cells without having to modify the spreadsheet. In addition, the overlay system provides an architecture in which different engine components can be developed to provide different augmentation functionality that can take advantage of the overlay functions provided by the overlay component.

In some embodiments, the overlay component tracks the current "cell visibility" by registering with the presentation manager to receive events of the user interface of the application, registering with the application to receive its events, and in some cases registering with the engine component to receive events that may in some way affect the current cell visibility. For example, whenever a user scrolls a spreadsheet, the cell visibility changes. When the overlay component detects a change in cell visibility, it requests the engine component to update the overlay window so that the correct overlay elements can be displayed for the currently visible cells. The overlay component may use subclassing functionality of the presentation manager to intercept events for the spreadsheet window and may use a layering functionality to layer the overlay window over the spreadsheet window. The layering functionality may allow the underlying cells to be seen through the overlay window. The engine component may cause a change in background color, a change in outlining of cells, a tool tip to appear, controls to be displayed, and so on. The overlay component may also use the application programming interface ("API") of the spreadsheet program to register to receive callbacks for various events. In addition, the overlay component may need to register with the presentation manager to receive events for various other auxiliary windows of the spreadsheet program, such as scroll bars. Because the overlay component receives events from both the presentation manager and the application, it can provide functionality that would not be possible if only presentation manager events or only application events were received. If only presentation manager events were received, then the overlay component could not determine, for example, what cells become visible when the user scrolls the application window. Similarly, if only application events were received, then the overlay component could not determine the location of the application window.

The architecture of the overlay system defines an interface through which the overlay component and the engine component interact. As a result, the overlay component can be used with different implementations of engine components that provide different augmentation functionality. In some embodiments, the engine component exposes an overlay support interface, a display object interface, and a display manager interface to the overlay component, and the overlay component exposes an overlay view interface to the engine component. The overlay support interface provides a mechanism for the overlay component to receive events detected by the engine component that may cause a change in the overlay window even though the cell visibility has not changed. For example, the engine component may detect that a user has selected a different cell without affecting cell visibility. In such a case, the engine component may want to change the overlay window in some way to indicate that a different cell has been selected. The overlay support interface also provides a mechanism through which the overlay component can retrieve references to the display object interfaces for display objects for controlling the generating of the overlay window for the currently visible cells. For example, the engine component may provide a reference to a display object interface for each cell that is currently visible, for each region of cells that is currently visible, or for only those areas over which controls are to be displayed.

The overlay component can invoke methods of those display object interfaces to generate the overlay window. The object manager interface may provide a mechanism for the overlay and engine components to exchange interfaces and methods for the overlay component to notify the engine component of certain events, such as a cell selection change. The overlay view interface that is exposed by the overlay component may provide cell visibility information or other information that may be needed by the engine component.

BRIEF DESCRIPTION OF THE DRAWINGS

FIG. 2 is a block diagram that illustrates data structures of the overlay component in some embodiments.

FIG. 3 is a block diagram that illustrates data structures of the engine component in some embodiments.

DETAILED DESCRIPTION

Figure 1:
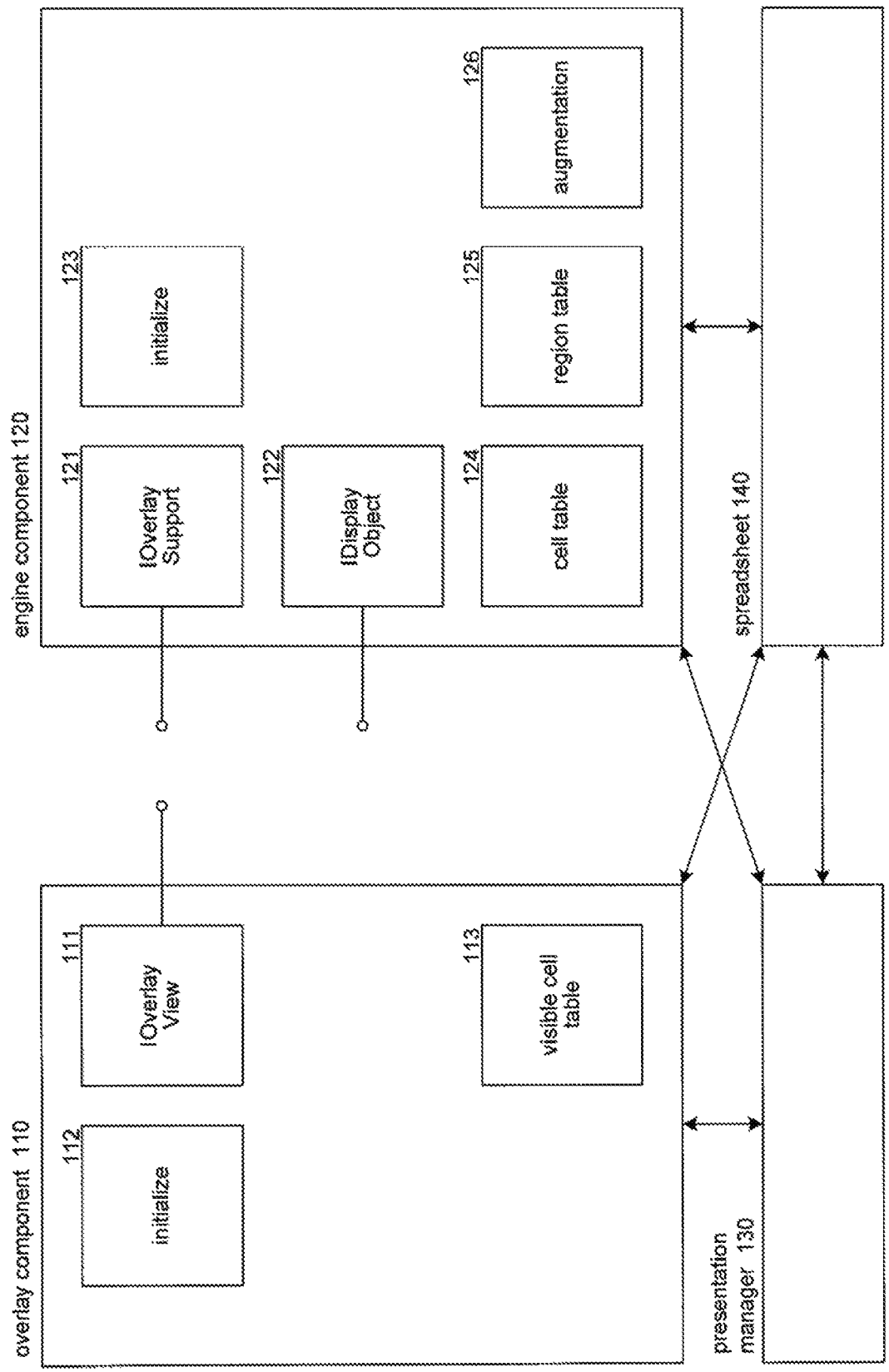
FIG. 1 is a block diagram illustrating the architecture of the overlay system in some embodiments.

FIG. 1 is a block diagram illustrating the architecture of the overlay system in some embodiments. The overlay system includes an overlay component 110 and an engine component 120. The overlay component includes an overlay view interface 111, an initialize component 112, and a visible cell table 113. The overlay view interface provides the engine component with access to visibility information of the spreadsheet. The initialize component is invoked at startup of the overlay system to initialize the overlay component. The visible cell table contains information describing cell visibility. The engine component includes an overlay support interface 121, a display object interface 122, an initialize component 123, a cell table 124, a region table 125, and an augmentation component 126. Although not illustrated, the overlay system may also include an object manager interface that is described below. The overlay support interface provides the overlay component with access to events recognized by the engine component and access to the display object interfaces. The display object interface includes methods for generating the overlay window based on the augmentation functionality. The initialize component is invoked at startup of the overlay system to initialize the engine component. The cell table and the region table contain augmentation data of the engine component when the engine component provides auditing functionality. Different data structures would be used when the engine component provides different functionality. The augmentation component provides the augmentation functionality of the engine component. The overlay component and the engine component each interact with a presentation manager 130 and a spreadsheet 140 to register for and receive event information and/or to generate their user interfaces. The spreadsheet component also interacts with the presentation manager to generate its user interface.

FIG. 2 is a block diagram that illustrates data structures of the overlay component in some embodiments. The overlay component includes an overlay data structure 200 that may include a visible cell table 113. The visible cell table contains an entry for each cell of the spreadsheet that is currently visible. Each entry may include a cell identifier (e.g., "A1") and the location of the cell relative to the spreadsheet window defined by, for example, the upper left and lower right corner of the cell in pixels. The overlay data structure may also include a display object interface table that includes a reference to each display object interface provided by the engine component for use in generating the overlay window. The overlay component may repopulate the entire visible cell table every time there is a change in cell visibility. Alternatively, the overlay system may be developed to track deltas in cell visibility and update the visible cell table and the overlay window accordingly. For example, if the cell visibility changes by the left column of cells becoming not visible and a new right column of cells becoming visible, then the overlay component may request from the engine component the display object interfaces for the newly visible cells of the right column only and discard the display object interfaces for the left column that is no longer visible (assuming that the overlay component can identify which display object interfaces affect which cells). The overlay component can then completely regenerate the overlay window or may alternatively shift the previous overlay window and invoke the display object interfaces for only the newly visible cells.

FIG. 3 is a block diagram that illustrates data structures of the engine component in some embodiments. The engine data structure 300 may include a cell table 124 and a region table 125 to support augmentation functionality relating to auditing of a spreadsheet. The cell table may contain an entry for each cell of the spreadsheet that identifies the cell (e.g., "A1"), indicates the current status of the cell (e.g., not audited), and includes a reference to a display object interface for that cell. The region table may contain an entry for each region of the spreadsheet. A region may correspond to contiguous cells that the engine component determines are related automatically (e.g., similar formulas) or based on user input. Each entry of the region table identifies the region (e.g., "R1"), the cell range of the region (e.g., "A1 ... D5"), the status of the region (e.g., "suspect"), and a reference to a display object interface for that region. The engine component may populate the cell table and the region table based on augmentation data that is stored in a file separate from the spreadsheet data. The augmentation component of the engine component modifies the augmentation data based on user input or based on analysis of the data of the spreadsheet.

The computing device on which the' overlay system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the overlay system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the overlay system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The overlay system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The data structures illustrated include logical representations of data. The actual organization of the data structures may include hash tables, indexes, trees, and so on.

The overlay support interface may be defined as follows:

```
interface IOverlay Support
{
    event Eventhandler DataChanged;
    event Eventhandler SelectionChanged;
    event Eventhandler SheetRenamed;
    ...
    list GetDisplayObjectsForRange (range);
}
```

The event handlers are defined to indicate various conditions detected by the engine component that should result in a regeneration of the overlay window. At initialization, the overlay component subscribes to these events. When the engine component invokes an event handler of the interface (i.e., publishes an event), the overlay component receives an event notification. Upon receiving the event notification, the overlay component calls the display object interfaces to update the overlay window. The get display objects for range method is invoked by the overlay component to retrieve from the engine component a list of references to display object interfaces for cells or regions within the specified range.

The display object interface may be defined as follows:

```
interface IDisplayObject
{.
    void Paint (graphicsbuffer, area, ...);
    void PaintWithMouseHover (graphicsbuffer, area, ...);
    void HandleClick (graphic buffer, area, ...);
    ...
}
```

Each method is for generating an area (e.g., a cell, a region, or an area for a control) of the overlay window under different conditions. The paint method is invoked by the overlay component when the overlay for the area is to be regenerated. The graphics buffer represents the bitmap for the overlay window, and the area represents the area in the graphics buffer for the cell. The paint with mouse hover method is invoked by the overlay component when the user hovers a mouse over a cell. In such a case, the engine component may want to display a tool tip near the cell or highlight the cell. The handle click method is invoked via the overlay component whenever a user clicks on an area of the overlay window that has been generated by a display object interface. When the user clicks on an area, the engine component may want to highlight the underlying cell and collect augmentation data for that cell in a separate window or use the click as an indication of augmentation data (e.g., clicking on an area that contains a "✓" to indicate that a cell is correct.

Figure 4:
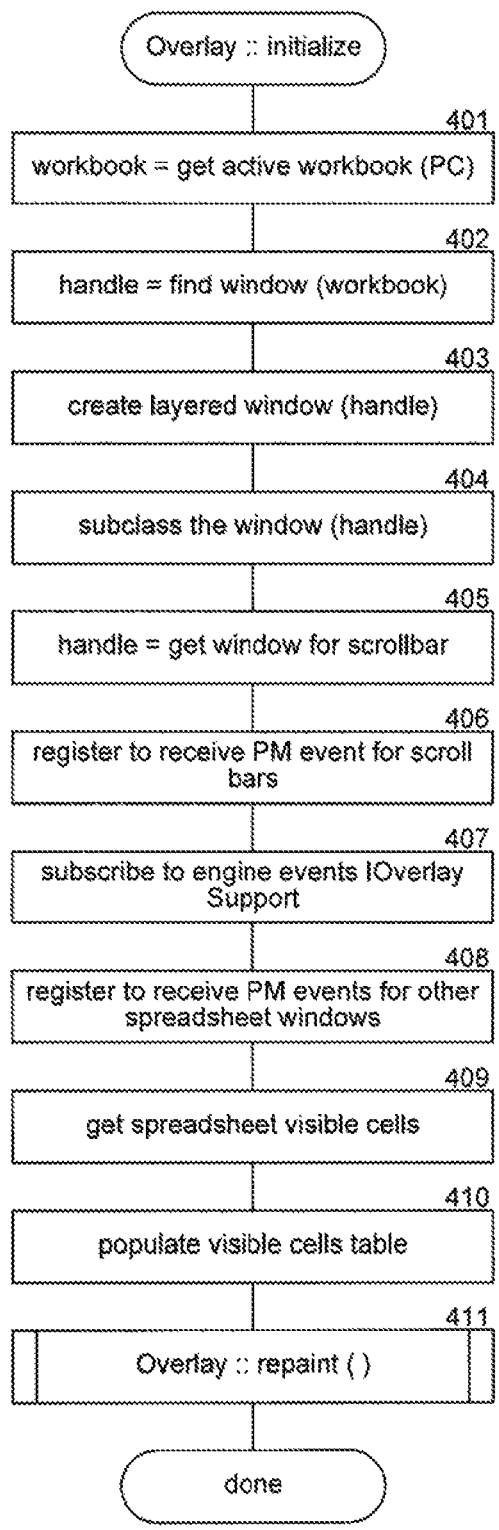
FIG. 4 is a flow diagram that illustrates the processing of the initialize component of the overlay component in some embodiments.

FIG. 4 is a flow diagram that illustrates the processing of the initialize component of the overlay component in some embodiments. The initialize component is invoked when the overlay system first starts up. In block 401, the component may retrieve from the spreadsheet an indication of the currently active workbook of the spreadsheet. In some embodiments, the overlay component may be adapted to handle multiple panes that may be displayed by a spreadsheet program. In such a case, similar functionality would be performed on a pane-by-pane basis. In block 402, the component retrieves a handle to the spreadsheet window for the currently active workbook. In block 403, the component creates the overlay window as a layered window of the spreadsheet window. The layering allows the overlay window to receive user input that is directed to an area of the overlay window that contains generated graphics (e.g., a control). Other user input is sent directly to the underlying application window. In block 404, the component registers to receive messages by subclassing the spreadsheet window. The subclassing will allow the overlay window to intercept the events of the spreadsheet window. In block 405, the component retrieves handles for the scroll bars of the spreadsheet window. The scroll bars may be represented by separate windows of the presentation manager. In block 406, the component registers to receive event notifications for the scroll bars. In block 407, the component subscribes to events generated by the engine component via the overlay support interface. In block 408, the component registers with the presentation manager to receive events for various other windows of the spreadsheet program. In block 409, the component invokes an API of the spreadsheet application to identify the cells that are currently visible. In block 410, the component populates the visible cell table. In block 411, the component invokes a repaint method of the overlay component to effect the initial generation and display of the overlay window.

Figure 5:
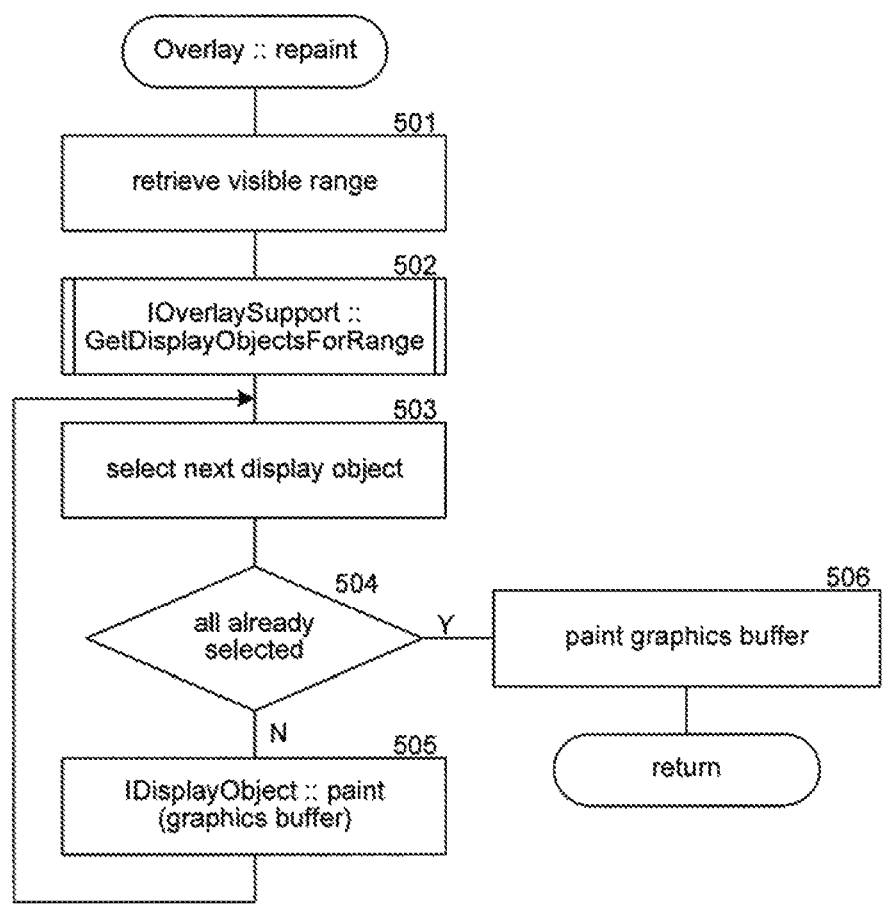
FIG. 5 is a flow diagram that illustrates the processing of the repaint component of the overlay component in some embodiments.

FIG. 5 is a flow diagram that illustrates the processing of the repaint component of the overlay component in some embodiments. The component is invoked to generate and display the overlay window. In block 501, the component retrieves the range of visible cells from the visible cell table. In block 502, the component invokes the get display objects for range component of the overlay support interface to retrieve the display object interfaces for all those cells or regions that are currently visible. In blocks 503-505, the component loops invoking the paint method of each display object interface. In block 503, the component selects the next display object interface. In decision block 504, if all such display object interfaces have already been selected, then the component continues at block 506, else the component continues at block 505. In block 505, the component invokes the paint method of the selected display object interface passing a graphics buffer representing the overlay window. The component then loops to block 503 to select the next display object interface. In block 506, the component effects the display of the graphics buffer as the overlay window and then returns.

Figure 6:
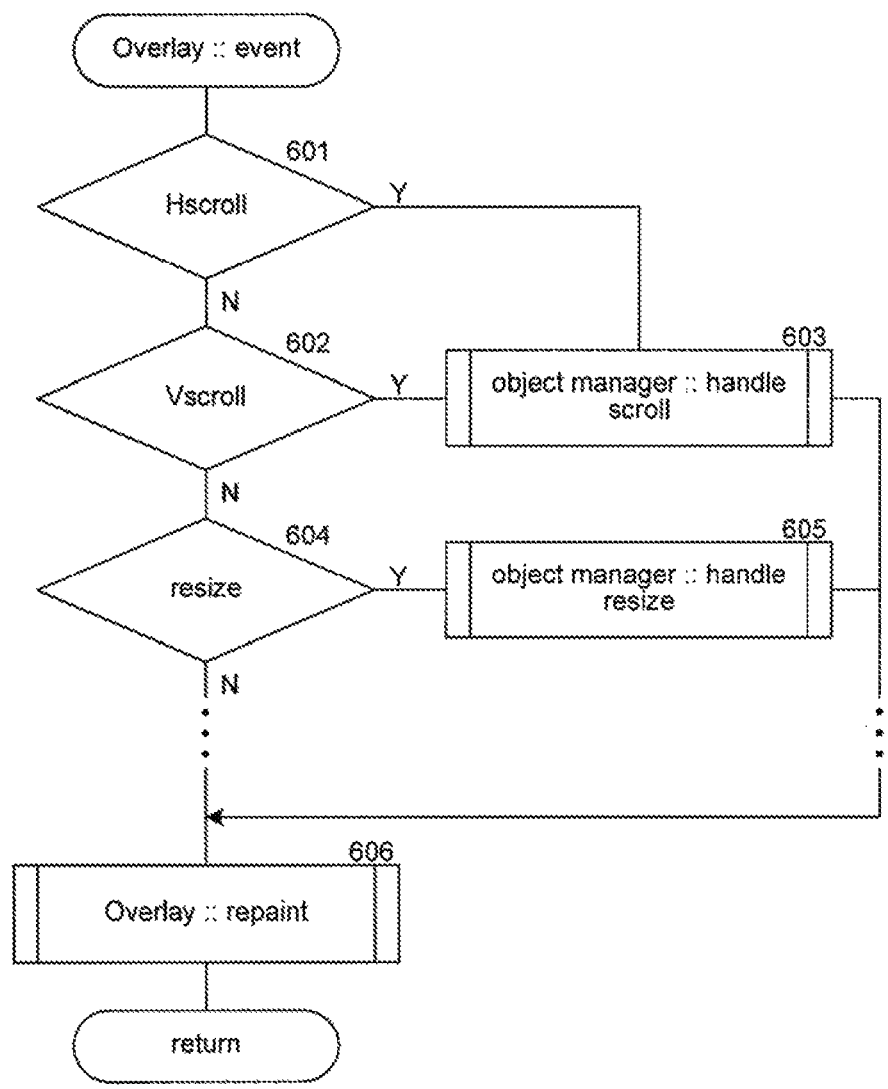
FIG. 6 is a flow diagram that illustrates the processing of an event processing component of the overlay component in some embodiments.

FIG. 6 is a flow diagram that illustrates the processing of an event processing component of the overlay component in some embodiments. The component is invoked whenever an event notification is received by the overlay component. The component identifies the event, performs the appropriate processing, and regenerates and displays the overlay window. In decision blocks 601-602, if the event indicates a scroll of the spreadsheet window, then the component continues at block 603, else the component continues at block 604. In block 603, the component invokes the handle scroll method of the object manager interface to notify the engine component that the scroll bars have been used to scroll the spreadsheet window. In decision block 604, if the event indicates that the spreadsheet window has been resized, then the component continues at block 605, else the component continues to identify the event as indicated by the ellipsis. In block 605, the component invokes the handle resize method of the object manager interface to notify the engine component. In block 606, the component invokes the repaint component of the overlay component to regenerate and display the overlay window.

Figure 7:
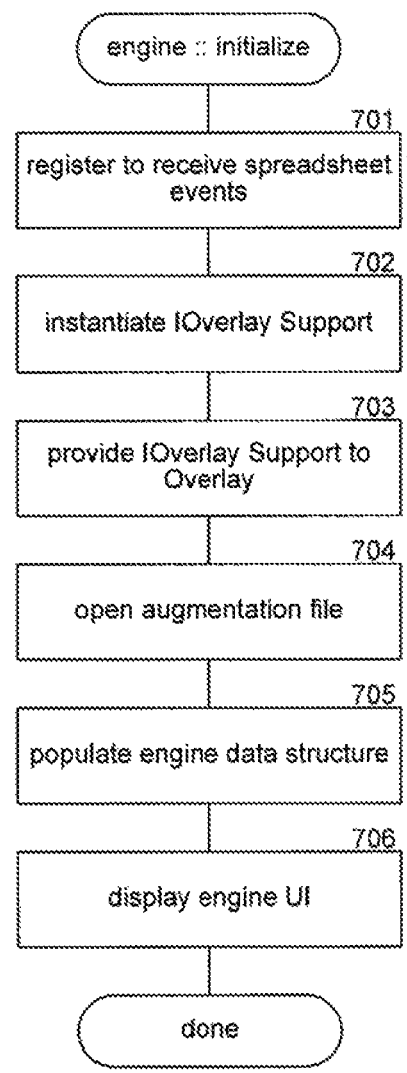
FIG. 7 is a flow diagram that illustrates the processing of the initialize component of the engine component in some embodiments.

FIG. 7 is a flow diagram that illustrates the processing of the initialize component of the engine component in some embodiments. The component is invoked at the startup of the overlay system. In block 701, the component registers to receive spreadsheet events that affect cell visibility (e.g., selection of a cell that is not currently visible). In block 702, the component instantiates the overlay support interface. In block 703, the component provides a reference to the overlay interface to the overlay component. In block 704, the component opens an augmentation file that contains the augmentation data. Alternatively, the component may create an augmentation file and initialize it. In block 705, the component populates the engine data structure including the cell table and the region table with data from the augmentation file. In block 706, the component may display a user interface for the engine component.

Figure 8:
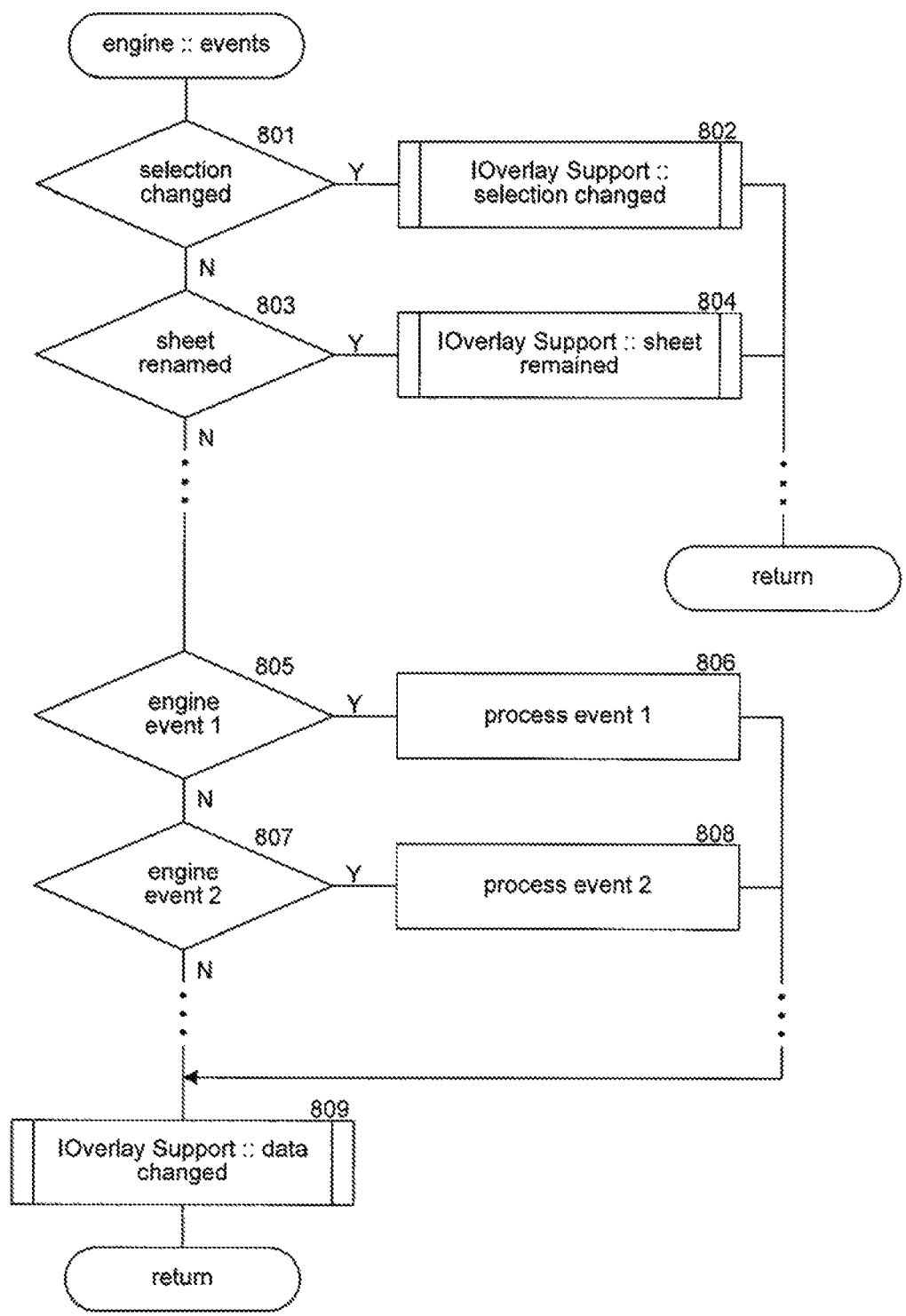
FIG. 8 is a flow diagram that illustrates the processing of an events component of the engine component in some embodiments.

FIG. 8 is a flow diagram that illustrates the processing of an events component of the engine component in some embodiments. The component is invoked whenever an event is received by the engine component. The events may include cell visibility events or events related to the generation of the augmentation data of the engine component. In decision block 801, if the cell selection has changed, then the component continues at block 802, else the component continues at block 803. In block 802, the component invokes the selection changed method of the overlay support interface to notify the overlay component that the cell selection has changed and then returns. In decision block 803, if the event indicates that a sheet has been renamed, then the component continues at block 804, else the component continues to identify events as indicated by the ellipsis. In block 804, the component invokes a sheet renamed method of the overlay support interface to notify the overlay component that a sheet has been renamed and then returns. In decision block 805, if another engine event has been identified, then the component continues at block 806 to process the event, else the component continues at block 807. In decision block 807, if another engine event has been identified, then the component processes that event in block 808, else the component continues to identify events as indicated by the ellipsis. In block 809, the component invokes the data changed component of the overlay support interface to notify the overlay component that the data of the overlay window needs to be updated. The component then returns.

Figure 9:
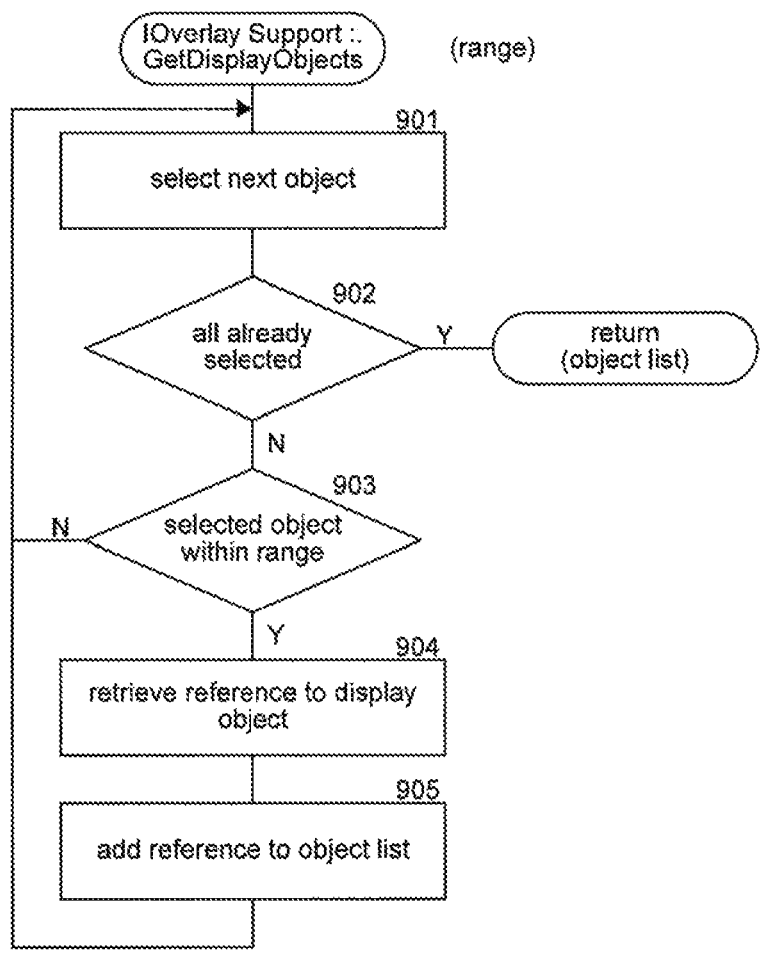
FIG. 9 is a flow diagram illustrating the processing of the get display objects for range method of the overlay support interface of the engine component in some embodiments.

FIG. 9 is a flow diagram illustrating the processing of the get display objects for range method of the overlay support interface of the engine component in some embodiments. The component loops selecting each object (e.g., cell or region) within the passed range and adding its display object interface to a list. In block 901, the component selects the next object of the spreadsheet. In decision block 902, if all the objects have already been selected, then the component returns an indication of the object list, else the component continues at block 903. In decision block 903, if the selected object is within the range, then the component continues at block 904, else the component loops to block 901 to select the next object. In block 904, the component retrieves a reference to the display object interface for the selected object. In block 905, the component adds the reference to the object list and then loops to block 901 to select the next object of the spreadsheet.

Figure 10:
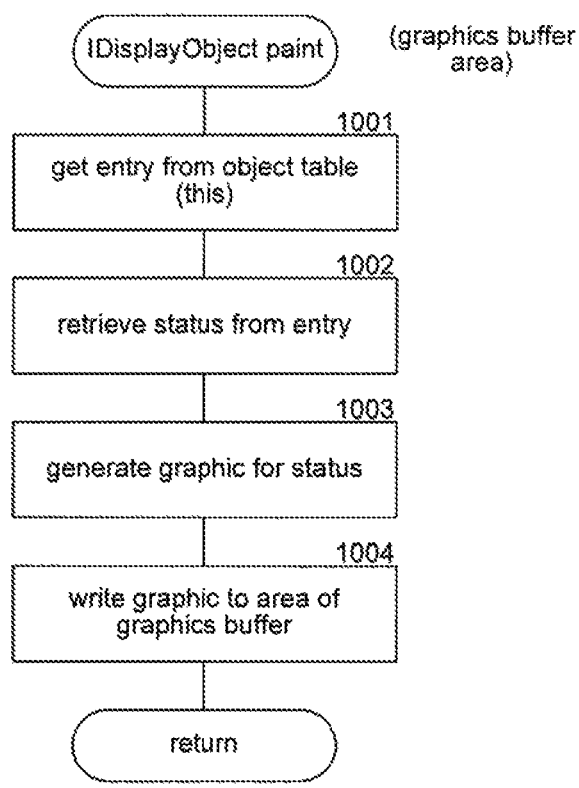
FIG. 10 is a flow diagram that illustrates the processing of the paint method of the display object interface in some embodiments.

FIG. 10 is a flow diagram that illustrates the processing of the paint method of the display object interface in some embodiments. The component is passed a graphics buffer and an area within the graphics buffer so that the engine component can update the graphics buffer based on the augmentation data for the object (e.g., cell or region) represented by the display object interface. In block 1001, the component retrieves the entry from the cell table or region table for this object. In block 1002, the component retrieves the status from the entry. In block 1003, the component generates the graphic for the status. In block 1004, the component writes the graphic to the area of the graphics buffer and then returns.

From the foregoing, it will be appreciated that specific embodiments of the invention have been described herein for purposes of illustration, but that various modifications may be made without deviating from the spirit and scope of the invention. For example, if the application is a word processing application, then the overlay component may track visible objects such as words, phrases, sentences, or paragraphs of a document. The engine component may provide functionality to annotate the visible objects and store the annotation data in a separate file from the underlying document without modifying the underlying document. In addition, the overlay system may be implemented without the overlay component and the engine component being functionally separate components. Rather, the functionality of the overlay component and the engine component can be integrated into a single component. Furthermore, the functionality could alternatively be divided into many components that combine to provide the overall functionality of the overlay system. Accordingly, the invention is not limited except as by the appended claims.

I claim:

1. A computing device including at least one hardware processor and memory storing computer instructions that, when executed by said hardware processor, cause said computing device to perform corresponding operations, said computer instructions comprising:
   an overlay component including a subset of said computer instructions configured to
      communicate with a window manager configured to provide a graphical user interface to a user, said graphical user interface displaying data of a first application,
      register with said window manager to receive events corresponding to changes to said graphical user interface,
      register with said first application to receive from said first application events corresponding to visible data of said first application, said visible data including at least one displayed object,
      provide an overlay window to said window manager, said overlay window being configured to overlay said visible data of said first application with overlay elements of said overlay window, said overlay elements including at least one overlay object corresponding to said displayed object, and
      initiated by and responsive to receiving an event indicative of a change in said visible data of said first application, provide a second overlay window configured to accommodate said change in said visible data; and
   an engine component including a second subset of said computer instructions configured to
      provide a particular interface mechanism to said graphical user interface for collecting augmentation data corresponding to said first application,
      store said augmentation data in association with said data of said first application, and
      generate said overlay window with said overlay elements derived from said augmentation data; and
   wherein
   said overlay component and said engine component are both included in a second application, said first application and said second application being separate applications; and
   said augmentation data includes a record that associates said at least one overlay object with said at least one displayed object by including information indicative of said at least one overlay object in one field of said record and information indicative of said at least one displayed object in another field of said record.

2. The computing device of claim 1, wherein:
   said change in said visible data of said first application includes a change in a location of said displayed object with respect to said graphical user interface from a first displayed location to a second displayed location;
   a first location of said overlay object in said overlay window corresponds to said first displayed location of said displayed object; and
   a second location of said overlay object in said second overlay window corresponds to said second displayed location of said displayed object.

3. The computing device of claim 1, wherein said overlay component registers with said window manager and said first application during an initialization routine occurring prior to said overlay component providing said overlay window.

4. The computing device of claim 1, wherein:
   said graphical user interface includes at least one window corresponding to said first application;
   said visible data of said first application constitutes a first layer of said at least one window; and
   said overlay window constitutes a second layer of said at least one window.

5. The computing device of claim 4, wherein:
   said second layer of said at least one window includes said at least one overlay object and said particular interface mechanism;
   said graphical user interface receives input from said user;
   if said user input is directed toward said second layer, said graphical user interface provides said user input to said engine component; and if said user input is directed toward said first layer, said graphical user interface provides said user input to said first application.

6. The computing device of claim 5, wherein said augmentation data is collected based at least in part on said user input.

7. The computing device of claim 1, wherein:
said at least one overlay object has a first position in said overlay window;
said at least one overlay object has a second position in said second overlay window; and
a relative location of said at least one overlay object relative to said at least one displayed object is the same in said overlay window and said second overlay window.

8. The computing device of claim 1, wherein:
said first application stores data of the first application in a first file system object; and
said engine component stores said augmentation data in a second file system object separate from said first file system object.

9. The computing device of claim 1, wherein prior to providing said second overlay window said overlay component determines that said change in said visible data of said first application necessitates said second overlay window.

10. A method for providing an overlay window, said method comprising:
communicating with a window manager configured to provide a graphical user interface to a user, said graphical user interface displaying data of a first application;
registering with said window manager to receive events corresponding to changes to said graphical user interface;
registering with said first application to receive from said first application events corresponding to visible data of said first application, said visible data including at least one displayed object;
providing an overlay window to said window manager, said overlay window being configured to overlay said visible data of said first application with overlay elements of said overlay window, said overlay elements including at least one overlay object corresponding to said displayed object;
initiated by and responsive to receiving an event indicative of a change in said visible data of said first application, providing a second overlay window configured to accommodate said change in said visible data;
providing a particular interface mechanism to said graphical user interface for collecting augmentation data corresponding to said first application, said augmentation data including a record, said record including information indicative of said at least one overlay object in one field of said record and information indicative of said displayed object in another field of said record;
storing said augmentation data in association with said data of said first application;
associating said at least one overlay object with said at least one displayed object based at least in part on said augmentation data; and
generating said overlay window with said overlay elements derived from said augmentation data; and
wherein said overlay window, said overlay elements, said overlay object, said second overlay window, said particular interface mechanism, and said augmentation data are all parts of a second application, said first application and said second application being separate applications.

11. The method of claim 10, wherein:
said change in said visible data of said first application includes a change in a location of said displayed object with respect to said graphical user interface from a first displayed location to a second displayed location;
a first location of said overlay object in said overlay window corresponds to said first displayed location of said displayed object; and
a second location of said overlay object in said second overlay window corresponds to a second displayed location of said displayed object.

12. The method of claim 10, wherein said steps of registering with said window manager and registering with said first application include registering with said window manager and said first application during an initialization routine prior to providing said overlay window.

13. The method of claim 10, wherein:
said graphical user interface includes at least one window corresponding to said first application;
said visible data of said first application constitutes a first layer of said at least one window; and
said overlay window constitutes a second layer of said at least one window.

14. The method of claim 13, wherein:
said second layer of said at least one window includes said at least one overlay object and said particular interface mechanism;
providing said user input received by said graphical user interface to an engine component associated with said overlay window if said user input is directed toward said second layer; and
providing said user input received by said graphical user interface to said first application if said user input is directed toward said first layer.

15. The method of claim 14, further comprising collecting said augmentation data based at least in part on said user input.

16. The method of claim 10, wherein:
said at least one overlay object has a first position in said overlay window;
said at least one overlay object has a second position said second overlay window; and
a relative location of said at least one overlay object relative to said at least one displayed object is the same in said overlay window and said second overlay window.

17. The method of claim 16, wherein said step of storing said augmentation data in association with said data of said first application includes storing said augmentation data separately from and without modifying any stored data of said first application.

18. The method of claim 10, further comprising determining that said change in said visible data of said first application necessitates said second overlay window prior to providing said second overlay window.

* * * * *